United States Patent [19]

Kemp

[11] Patent Number: 4,880,522

[45] Date of Patent: Nov. 14, 1989

[54] PROCESS FOR HYDROTREATING HYDROCARBON FEEDS

[75] Inventor: Richard A. Kemp, Stafford, Tex.

[73] Assignee: Shell Oil Company, Houston, Tex.

[21] Appl. No.: 256,424

[22] Filed: Oct. 12, 1988

Related U.S. Application Data

[62] Division of Ser. No. 100,662, Sep. 24, 1987, Pat. No. 4,810,684.

[51] Int. Cl.$^4$ ............................................. C10G 45/08
[52] U.S. Cl. ........................ 208/216 PP; 208/251 H; 208/254 H
[58] Field of Search ................. 208/217, 216 PP, 213, 208/251 H, 254 H

[56] References Cited

U.S. PATENT DOCUMENTS

| | | | |
|---|---|---|---|
| 3,390,100 | 6/1968 | Chomitz et al. | 252/455 |
| 3,864,461 | 2/1975 | Miller et al. | 502/489 |
| 4,019,978 | 4/1977 | Miller et al. | 502/211 |
| 4,036,784 | 7/1977 | Gembicki et al. | 252/465 |
| 4,082,695 | 4/1978 | Rosinski et al. | 252/465 |
| 4,089,774 | 5/1978 | Oleck et al. | 208/89 |
| 4,094,820 | 6/1978 | Mickelson | 252/465 |
| 4,124,537 | 11/1978 | Gembicki et al. | 252/465 |
| 4,192,736 | 3/1980 | Klukodahl | 208/251 |
| 4,328,127 | 5/1982 | Angevine et al. | 252/439 |
| 4,404,097 | 9/1983 | Angevine et al. | 208/210 |
| 4,615,999 | 10/1986 | Takumi et al. | 502/314 |
| 4,786,403 | 11/1988 | Kemp | 208/217 |
| 4,786,404 | 11/1988 | Kemp | 208/217 |
| 4,810,684 | 3/1989 | Kemp | 502/211 |

*Primary Examiner*—Paul E. Konopka
*Attorney, Agent, or Firm*—Pamela J. McCollough

[57] ABSTRACT

This invention relates to hydrotreating with highly active hydrotreating catalysts prepared by incorporating an element selected from the group consisting of nickel, cobalt and mixtures thereof, a heavy metal selected from the group consisting of molybdenum, tungsten and mixtures thereof, into a phosphated alumina hydrogel. The final calcined catalysts have surface areas at least about 300 m$^2$/g, at least about 20% of the pore volume in pores having diameters greater than about 350 Å and at least about 20% of the pore volume in pores having diameters less than about 70 Å.

110 Claims, No Drawings

PROCESS FOR HYDROTREATING HYDROCARBON FEEDS

This is a division of application Ser. No. 100,662, filed Sept. 24, 1987, now U.S. Pat. No. 4,810,684.

FIELD OF THE INVENTION

This invention relates to a process for preparing highly active phosphated alumina hydrogel-derived catalysts.

BACKGROUND OF THE INVENTION

In the catalytic processing of petroleum feedstocks, it is often desirable to alter the pore structure of the catalyst in order to accommodate different types of feeds. For example, when processing feedstocks with no metals or with a low metals content, it may be technically and economically desirable to use narrow-pore catalysts. On the other hand, when processing feedstocks of high metals content, the metals tend to deposit rapidly on the catalyst surface and plug the pores of conventional hydrogen processing catalysts, resulting in a loss of catalytic activity for sulfur and nitrogen removal. In order to maintain hydrotreating activity, it is necessary that the catalyst be high in surface area. To facilitate the diffusion of large components into and out of the catalyst and to prevent surface deposits of coke and metals, large pore diameters are required. These criteria necessitate the use of bimodal catalysts which have high surface areas and a significant fraction of pore volume in large pores. The large pores allow enhanced diffusion of large molecules into the catalyst while the smaller pores, providing most of the surface area, allow for hydroprocessing of the feed. Catalysts of this type can be used as hydrotreating catalysts, especially for residue/demetallization applications.

SUMMARY OF THE INVENTION

The present invention relates to a process for the preparation of bimodal catalysts having surface areas at least about 300 $m^2/g$ with a significant fraction (at least about 20%) of the pore volume located in pores having diameters greater than about 350 Å and a significant fraction of pores (at least about 20%) in diameters less than about 70 Å. These catalysts are prepared by a process which comprises:

(a) titrating an aqueous solution of an acid aluminum salt and an aqueous solution of a basic aluminum compound in the presence of a phosphorus-containing compound, thereby forming a precipitate, (b) aging the precipitate at a temperature ranging from about 20° C. to about 90° C. for at least about 15 minutes at a pH ranging from about 8.0 to about 12.0, (c) washing the precipitate, (d) mixing the precipitate with an element selected from the group consisting of nickel, cobalt, and mixtures thereof, and a heavy metal selected from the group consisting of molybdenum, tungsten, and mixtures thereof, at a pH in the range between about 4.0 and about 9.0 and a temperature in the range between about 25° C. and about 100° C. until absorption of the metal salts onto the gel is sufficient to yield a final catalyst having from about 1% w to about 5% w cobalt and/or nickel and from about 8% w to about 32% w heavy metal, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

It has been found that hydrogel-derived catalysts prepared according to the invention have activities equal to or better than catalysts prepared by conventional techniques when compared on a metals efficiency basis while having densities significantly lower than conventionally prepared catalysts. Two of the major advantages of the hydrogel route are higher metals utilization and lower cost of catalyst manufacture relative to conventionally prepared catalysts. The catalysts prepared according to the invention have high surface areas, at least about 300 $m^2/g$; at least about 20% of the pore volume located in pores having diameters greater than about 350 Å; and at least about 20% of the pore volume located in pores having diameters less than about 70 Å. These catalysts are particularly suitable for residue/demetallization applications.

The present invention also includes using catalysts prepared according to the invention to hydrotreat hydrocarbon feedstocks.

DESCRIPTION OF THE PREFERRED EMBODIMENTS

In the process of the instant invention, a highly active hydrotreating catalyst is prepared by incorporating an element selected from the group consisting of nickel, cobalt and mixtures thereof, a heavy metal selected from the group consisting of molydenum, tungsten and mixtures thereof, into a phosphated alumina hydrogel prepared by titrating an aqueous solution of an acid aluminum compound and an aqueous solution of a basic aluminum compound in the presence of a phosphorus-containing compound.

The phosphated alumina hydrogel can be prepared by titrating an aqueous solution of one or more aluminum salt(s) with an appropriate acidic or basic material or solution in the presence of a phosphorus-containing compound to cause precipitation of the phosphated alumina gel. One skilled in the art will recognize that the alumina gel can be prepared by titrating an acidic aluminum salt such as, for example, aluminum sulfate, aluminum nitrate, or aluminum chloride, in aqueous solution with a basic precipitating medium such as, for example, sodium hydroxide or ammonium hydroxide in the presence of a phosphorus-containing compound, or, by titrating an alkali metal aluminate such as, for example, sodium aluminate or potassium aluminate, in aqueous solution with an acidic precipitating medium such as, for example, hydrochloric acid or nitric acid, in the presence of a phosphorus-containing compound. One skilled in the art will recognize that the adjustment of the pH of an aluminum-containing solution to between about 5.5 and about 10.0 will result in precipitation of the aluminum as phosphated aluminum hydroxide or phosphated hydrated aluminum oxide.

In a preferred embodiment, the phosphated alumina hydrogel is prepared by titrating an aqueous solution of an alkali metal aluminate and an aqueous solution of an acid aluminum salt, at least one of which has a phosphorus-containing compound dissolved therein, to cause precipitation of the phosphated alumina gel. Suitable acidic aluminum salts include aluminum sulfate, aluminum nitrate and aluminum chloride. A preferred species is aluminum sulfate. Suitable alkali metal aluminates are sodium aluminate and potassium aluminate. The precipitation can be carried out by adding an aqueous solution of the basic aluminum species to an aqueous solution of the acidic aluminum species or the procedure can be reversed by adding an aqueous solution of the acidic aluminum species to an aqueous solution of the basic aluminum species (referred to as "sequential precipitation"). Preferably, the precipitation in the instant invention is carried out by simultaneously adding the acid aluminum species and the basic aluminum species, at least one of which has a phosphorus-containing compound dissolved therein, to cause precipitation of the hydrogel (referred to as "simultaneous precipitation"). The maximum rate of addition of the acid aluminum species and the basic aluminum species is fixed by the rate at which the two streams can be mixed and the pH and temperature of the system can be effectively controlled.

As used herein, the term "a phosphorus-containing compound" is generic and refers to one phosphorus-containing compound as well as more than one phosphorus-containing compound. The phosphorus-containing compound is generally selected from the group consisting of phosphoric acid, a phosphate salt and mixtures thereof. Suitable phosphate salts include alkali metal phosphates, alkali metal hydrogen phosphates, ammonium phosphate and ammonium hydrogen phosphate. The phosphorus-containing compound is preferably phosphoric acid and is preferably mixed with the acid aluminum species prior to the precipitation. Alternatively, the phosphorus-containing compound can be sodium or ammonium phosphate and mixed with the basic aluminum species prior to precipitation. The phosphorus-containing compound can also be added as a separate solution or added to both the acid aluminum species and the basic aluminum species without significantly affecting the results. In a preferred embodiment, the phosphorus-containing compound is commercially available 85% phosphoric acid although other phosphorus-containing materials may be utilized. The amount of phosphorus-containing compound added to the acid aluminum species and/or the basic aluminum species is from about 0.06 to about 0.30 moles of phosphorus per mole of aluminum.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

The temperature and pH of the precipitation are important variables in the preparation of the aluminas into which metals can be incorporated to form catalysts with desirable physical qualities. One skilled in the art would recognize that changes in precipitation temperatures and pHs result in changes in porosities. The optimal temperatures and pHs for the precipitation of the aluminas can be determined with a minimal amount of routine experimentation. In the instant invention, a precipitation temperature typically ranges from about 20° C. to about 90° C., preferably from about 50° C., to about 85° C., more preferably from about 55° C. to about 65° C., and a precipitation pH typically ranges between about 5.5 and about 10.0, preferably between about 5.5 and about 8.0, and more preferably between about 6.0 and about 7.5. The length of time required for the precipitation step is typically from about 15 minutes to about 45 minutes. The period of time for the precipitation should be sufficiently long for adequate mixing of the materials, but not long enough for enhanced particle growth to occur.

After the precipitation step is completed, the pH of the slurry is adjusted to a pH in the range from about 8.0 to about 12.0, preferably about 8.0 to about 11.0, and more preferably from about 8.0 to about 10.5, aged at a temperature in the range from about 20° C. to about 90° C., preferably about 50° C. to about 85° C. for at least 15 minutes. An upper limit on the length of time for aging is not critical and is normally determined by economical considerations. Aging times will typically range from about 0.1 to about 10 hours, preferably from about 0.25 to about 5 hours, and more preferably from about 0.25 to about 1 hour. In general, aluminas with acceptable properties are produced by holding the aging temperature equal to the precipitation temperature.

After aging, the slurry is washed and filtered in routine fashion to remove substantially all of the removable water-soluble salts formed during the precipitation of the phosphated hydrogel. The preferred solvent for washing is water although other solvents such as lower alkanols may be utilized.

After washing, the metals are incorporated into the phosphated hydrogel. One method for adding the metals to the hydrogel is a reslurry step in which the hydrogel is reslurried with a metals solution containing solubilized salts of an element selected from the group consisting of nickel, cobalt and mixtures thereof, and a heavy metal selected from the group consisting of molybdenum, tungsten and mixtures thereof, sufficient to deposit on the final catalyst from about 1% w to about 5% w nickel and/or cobalt and from about 8% w to about 18% w molybdenum or about 10% w to about 32% w tungsten. When mixtures of molybdenum and tungsten are utilized, the final catalyst contains from about 8% w to about 32% w molybdenum and tungsten. The solution may, however, contain amounts of nickel and/or cobalt and molybdenum or tungsten in excess of that required to deposit the aforesaid amounts of metals, which excess may be removed by washing or other techniques following the reslurry step. A typical metals solution can be prepared by combining a molydbenum and/or tungsten solution with a nickel and/or cobalt solution. In a preferred embodiment, the metals solution contains a stabilizing amount of a phosphorus-containing compound. Typically, the metals solution contains a phosphorus-containing compound in an amount of from about 0.2 to about 1.5 moles of phosphorus per mole of molybdenum or tungsten. Suitable phosphorus-containing compounds are the acids of phosphorus and their salts. Typical acids of phosphorus include phosphoric acids, phosphonic acids, phosphinic acids, phosphorous acids and the like. The phosphorus-containing compound is generally selected from the group consisting of phosphoric acid, a phosphate salt and mixtures thereof. Suitable phosphate salts include alkali metal phosphates, alkali metal hydrogen phosphates, ammonium phosphate and ammonium hydrogen phosphate.

The molybdenum solution consists of a water-soluble source of molybdenum oxide such as ammonium heptamolybdate or ammonium dimolybdate dissolved in water and optionally, a phosphorus-containing compound. Hydrogen peroxide may also be used to aid in solution preparation in some cases. A preferred method for preparing the molybdenum solution consists of adding hydrogen peroxide to the solution in the range of about 0.1 to about 1.0 mole of hydrogen peroxide per mole of molybdenum. Optionally, a suitable soluble amine compound such as monoethanolamine, propanolamine or ethylenediamine may be added to the molybdenum solution in order to aid in stabilization of the solution.

The tungsten solution typically consists of ammonium metatungstate dissolved in water and optionally, a phosphorus-containing compound. A preferred method for preparing the tungsten solution consists of adding hydrogen peroxide to the solution in the range of about 0.1 to about 1.0 mole of hydrogen peroxide per mole of tungsten. In addition, a suitable soluble amine compound such as monoethanolamine, propanolamine or ethylenediamine may be added to the tungsten solution in order to aid in stabilization of the solution.

The nickel solution consists of nickel salts dissolved in water and optionally, a phosphorus-containing compound. A wide range of nickel compounds are suitable, such as nickel nitrate, nickel acetate, nickel formate, nickel sulfate, nickel oxide, nickel phosphate, nickel carbonate, nickel chloride, and nickel hydroxide. Two compounds that are especially useful are nickel nitrate and nickel carbonate.

The cobalt solution consists of cobalt salts dissolved in water and optionally, a phosphorus-containing compound. A wide range of cobalt compounds are suitable, such as cobalt nitrate, cobalt hydroxide, cobalt acetate, cobalt oxalate, or cobalt oxide. The preferred cobalt compound is cobalt nitrate.

An alternative method for incorporating the metals into the phosphated hydrogel is to add dry, water-soluble metal salts of an element selected from the group consisting of nickel, cobalt and mixtures thereof, and dry, water-soluble salts of a heavy metal selected from the group consisting of molybdenum, tungsten and mixtures thereof, to the phosphated hydrogel and mix until dissolution and adsorption of the metal salts and phosphorus onto the gel is substantially complete. The metal salts of nickel and/or cobalt and molybdenum and/or tungsten are added to the hydrogel in amounts sufficient to incorporate into the final catalyst from about 1% w to about 5% w cobalt and from about 8% w to about 18% w molybdenum or about 10% w to about 32% w tungsten. When mixtures of molybdenum and tungsten are utilized, the final catalyst contains about 8% w to about 32% w molybdenum and tungsten.

Molybdenum is generally added to the hydrogel as a dry, water-soluble source of molybdenum such as ammonium heptamolybdate or ammonium dimolybdate. Tungsten is typically added to the hydrogel as ammonium metatungstate. Nickel is preferably added to the hydrogel in the form of dry, water-soluble nickel nitrate, nickel acetate, nickel formate, nickel sulfate, nickel oxide, nickel phosphate, nickel carbonate, nickel chloride or nickel hydroxide, with nickel nitrate and nickel carbonate being preferred. Cobalt is added to the hydrogel in the form of dry, water-soluble nitrate, cobalt hydroxide, cobalt acetate, cobalt oxalate or cobalt oxide, with cobalt nitrate being preferred. In a preferred embodiment, a phosphorus-containing compound is added along with the metal salts to the phosphated hydrogel. The phosphorus-containing compound is typically added, either wet or dry, to the hydrogel in an amount ranging from about 0.2 to about 1.5 moles of phosphorus per mole of molybdenum or tungsten. The phosphorus-containing compound is preferably added directly to the hydrogel as phosphoric acid, a phosphate salt or mixtures thereof. Suitable phosphate salts include alkali metal phosphates, alkali metal hydrogen phosphates, ammonium phosphate and ammonium hydrogen phosphate. Alternatively, the phosphorus-containing compound and the dry nickel and/or cobalt salt can be mixed prior to addition to the phosphated hydrogel.

A preferred method of mixing the dry metal salts of nickel and/or cobalt and molybdenum and/or tungsten with the phosphated hydrogel consists of adding hydrogen peroxide to the mixture of dry metal salts and hydrogel in an amount ranging from about 0.1 to about 1.0 mole of hydrogen peroxide per mole of molybdenum and/or tungsten. Optionally, a suitable amine compound such a monoethanolamine, propanolamine or ethylenediamine may be added to the mixture of dry metal salts and hydrogel in order to aid in stabilization of the mixture of the metal salts and the phosphated hydrogel.

The dry metal salts of nickel and/or cobalt, molybdenum and/or tungsten and optionally, the phosphorus-containing compound (if added dry) are typically added to the hydrogel in the form of finely divided particles which are generally 100 mesh or less in size. While particle size is not critical and larger particle sizes may be utilized, it is economically advantageous to use particles which are 100 mesh or less in size.

It is also within the scope of this invention to combine the two methods described above for adding the metals to the phosphated hydrogel. For example, one metal may be added to the hydrogel as a dry salt and another added in the form of a solution. Various permutations of this combination of dry salts additions and metals solutions additions would be obvious to one skilled in the art.

The temperature and pH of the step in which the metals solutions and/or the dry metal salts are mixed with the phosphated hydrogel are important variables in the preparation of hydrogel-derived catalysts which have acceptable densities and porosities. The temperature of the reslurry and/or mixing step affects the catalysts only when a phosphorus-containing compound is added to the hydrogel along with the metals, with the trend being for higher temperatures to yield lower density catalysts. The mixing of the phosphated hydrogel with the metals solution or the dry metal salts is carried out at a pH in the range between about 4.0 and about 10.0, preferably between about 4.0 and about 9.0, more preferably between about 4.0 and about 8.0, and a temperature in the range between about 25° C. and about 100° C., preferably between about 25° C., and about 80° C., until incorporation of the metals salts into the gel is sufficient to yield a final calcined catalyst having from about 1% w to about 5% w nickel and/or cobalt and from 8% w to about 32% w heavy metal selected from the group consisting of molybdenum, tungsten and mixtures thereof. Typically, the times for mixing the hydrogel and the metals will range from about 0.5 to about 2 hours. Optionally, the resulting material can be washed to remove unadsorbed metals and filtered in routine fashion.

Following the addition of the metals to the phosphated hydrogel, the resulting material is partially dried to reduce loss on ignition (LOI) from about 90% to between about 55% and about 65%, preferably between about 55% and about 60%. As used herein, "loss on ignition" is equal to the amount of volatiles present in the hydrogel divided by the amount of volatiles present in the hydrogel plus the dry weight of the hydrogel multiplied by 100 percent. This reduction in the volatiles content of the hydrogel is critical to the formation of catalysts having at least about 20% of the pore volume in pores having diameters greater than about 350 Å and at least about 20% of the pore volume in pores having diameters less than about 70 Å. Materials which are not dried to the indicated LOIs do not produce the desired bimodal pore size distribution. In addition, materials which are too wet result in catalysts having poor physical properties and materials which are too dry cannot be extruded in a conventional manner. The partially dried material is then passed through a mixing means to peptize the gel and thus form linkages in order for the materials to be acceptable for conventional extrusion. Suitable mixing means include a work-intensive mixer such as, for example, a Readco Continuous Processor, or any other high shear, intensive work apparatus which peptizes the gel and renders the partially dried materials acceptable for conventional extrusion. The partially dried material is then extruded using conventional methods such as, for example, a Bonnot extruder, dried more completely and calcined. Drying is accomplished by conventional means. It may be carried out by forced draft drying, vacuum drying, air drying or similar means. Drying temperatures are not critical and depend upon the particular means utilized for drying. Drying temperatures will typically range from about 50° C. to about 150° C.

After drying, the material is calcined to produce the finished catalyst. The material may be calcined in an oxidizing or neutral atmosphere, although air is preferred. However, if binders and/or lubricants are used the material is heated in an oxygen-containing atmosphere, preferably air, in order to burn out the binders and lubricants. Calcining temperatures will typically range from about 300° C. to about 900° C. Burn-out temperatures will depend on the concentration of oxygen in the burn-out atmosphere as well as the burn-out time involved. Typically, burn-out temperatures will range from about 300° C. to about 900° C. Drying, calcining and burn-out may be combined in one or two steps. Most frequently the calcining and/or burn-out steps are combined using an oxygen-containing atmosphere.

Certain other processing steps may be incorporated into the above-described procedure without deviating from the scope and intent of this invention. For example, the partially dried material can be passed through the extruder several times as an alternative to passing the partially dried material through a work-intensive mixer.

The final catalysts are found to have surface areas greater than about 300 m$^2$/g, nitrogen pore volumes ranging from about 0.4 to about 1.2 cc/g and with at least 20% of their mercury pore volume in pores having diameters greater than about 350 Å and at least about 20%, preferably about 35%, of their pore volume in pores having diameters less than about 70 Å. In general, the metals contents of the final catalysts range from about 1% w to about 5% w nickel and/or cobalt, preferably from about 2.5% w to about 4% w nickel and/or cobalt, and from about 8% w to about 18% w, preferably from about 10% w to about 14% w molybdenum or about 10% w about 32% w, preferably from about 18% w to about 26% w tungsten.

The catalysts prepared in the instant invention can be suitably applied to hydrocarbon conversion processes such as hydrocracking, hydrotreating, isomerization, hydrogenation, dehydrogenation, oligomerization, alkylation, dealkylation and the like.

The catalysts of the instant invention are most commonly employed in hydrotreating and/or hydrocracking feedstocks ranging in volatilities from naphthas to petroleum residues, including materials derived from tar sands, shale oils and the like. Reaction temperatures will typically range from about 300° F. to about 900° F., preferably from about 500° F. to about 850° F. Reaction pressures are generally within the range of about 200 psig to about 3500 psig, preferably from about 600 psig to about 2500 psig. Reactions are conducted at liquid hourly space velocities within the range of about 0.05 to about 15 reciprocal hour.

Multiple uses of these feedstocks after treating with the catalysts of this invention are possible. Depending on the particular feedstocks treated, suitable uses can include conversion unit feedstocks such as thermal cracking and hydrocracking, or finished products such as gasoline, diesel, airline turbine fuel, furnace oils, solvents, fuel oils and asphalts.

The process for preparing the catalysts of the instant invention will be further described below by the following examples which are provided for illustration and which are not to be construed as limiting the invention.

EXAMPLE 1

102.5 kilograms of aluminum sulfate/phosphoric acid solution were prepared by solubilizing 11.2 kilograms of gibbsite (alpha-alumina trihydrate, 34% LOI) in 88.3 kilograms of 27% sulfuric acid and adding 3.0 kilograms of 85% phosphoric acid at a temperature slightly above 100° C. The solution was allowed to cool to 60° C. prior to use. 75.3 kilograms of sodium aluminate solution were prepared by solubilizing 28.0 kilograms of gibbsite (alpha-alumina trihydrate, 34% LOI) in 47.3 kilograms of 36% sodium hydroxide at a temperature slightly above 115° C. This solution was also allowed to cool to 60° C. prior to use. These two solutions were metered under computer control into a precipitation vessel containing a deionized water heel (162 kilograms) held at 60° C., maintaining a constant pH of 7.0 and a temperature of 60° C. The precipitation duration was fixed at 45 minutes. After the precipitation step was complete excess sodium aluminate solution (14.0 kilograms) was added to the slurry to raise the pH to the desired aging pH of 10.0. Total solution quantities used: acid—73.5 kilograms, base—64.0 kilograms. The slurry was aged for one hour at the elevated pH. The slurry was then filtered in a single step on a 1'×10' horizontal belt vacuum filter and washed with deionized water. The resulting phosphated alumina hydrogel generally had a water content between 75% and 90%, basis dry weight of alumina.

Nickel nitrate hexahydrate (190.89 g) was reacted with 85% phosphoric acid (33.34 g) and diluted to 1 liter with deionized water. Ammonium heptamolybdate (307.03 g) was reacted with 30% hydrogen peroxide (91 ml) and monoethanolamine (51.3 g) and diluted to 1 liter using deionized water. The two solutions were combined with intensive stirring. A portion of phosphated alumina hydrogel (6634 g, 85.51% LOI—961 grams dry weight) was reslurried with this solution and allowed to react for 2 hours at a pH of 5.5 (adjust with HCl) at 80° C. The slurry was then filtered hot and washed with 2 liters of deionized water, and then sucked dry on the Buchner funnel. The catalyst hydrogel was then dried in a forced air oven at approximately 120° C. until the LOI of the gel was 62.5%. The material was mulled in a Simpson mix muller for 15 minutes, then passed through a conventional Bonnot extruder. Drying at 120° C. was followed by calcination at 950° F. for two hours. The properties of the catalyst are listed in Tables I and II.

EXAMPLE 2

A catalyst was prepared according to Example 1 except that no phosphoric acid was added to the metals solution. The properties of the catalyst are listed in Tables I and II.

EXAMPLE 3

102.5 kilograms of aluminum sulfate/phosphoric acid solution were prepared by solubilizing 11.2 kilograms of gibbsite (alpha-alumina trihydrate, 34% LOI) in 88.3 kilograms of 27% sulfuric acid and adding 3.0 kilograms of 85% phosphoric acid at a temperature slightly above 100° C. The solution was allowed to cool to 60° C. prior to use. 75.3 kilograms of sodium aluminate solution were prepared by solubilizing 28.0 kilograms of gibbsite (alpha-alumina trihydrate, 34% LOI) in 47.3 kilograms of 36% sodium hydroxide at a temperature slightly above 115° C. This solution was also allowed to cool to 60° C. prior to use. These two solutions were metered under computer control into a precipitation vessel containing a deionized water heel (162 kilograms) held at 60° C., maintaining a constant pH of 7.0 and a temperature of 60° C. The precipitation duration was fixed at 45 minutes. After the precipitation step was complete excess sodium aluminate solution (14.0 kilograms) was added to the slurry to raise the pH to the desired aging pH of 10.0. Total solution quantities used: acid—77.5 kilograms, base—64.9 kilograms. The slurry was aged for one hour at the elevated pH. The slurry was then filtered in a single step on a 1'×10' horizontal belt vacuum filter and washed with deionized water. The resulting phosphated alumina hydrogel generally had a water content between 75% and 90%, basis dry weight of alumina.

Cobalt nitrate hexahydrate (163.24 g) was reacted with 85% phosphoric acid (25.53 g) and diluted to 1 liter with deionized water. Ammonium heptamolybdate (329.47 g) was reacted with 30% hydrogen peroxide (97 ml) and monoethanolamine (55.1 g) and diluted to 1 liter using deionized water. The two solutions were combined with intensive stirring. A portion of phosphated alumina hydrogel (6634 g, 85.51% LOI—961 grams dry weight) was reslurried with this solution and allowed to react for 2 hours at a pH of 5.0 (adjust with HCl) at 25° C. The slurry was then filtered and washed with 2 liters of deionized water, and then sucked dry on the Buchner funnel. The catalyst hydrogel was then dried in a forced air oven at approximately 120° C. until the LOI of the gel was 62.5%. The material was mulled in a Simpson mix muller for 15 minutes, then passed through the Readco mixer. The material was then extruded through a conventional Bonnot extruder. Drying at 120° C. was followed by calcination at 950° F. for two hours. The properties of the catalyst are listed in Tables I and II.

EXAMPLE 4

A catalyst was prepared according to Example 3 except that no phosphoric acid was added to the metals solution. The properties of the catalyst are listed in Tables I and II.

COMPARATIVE EXAMPLE A

A catalyst was prepared in a manner similar to Example 1 except that the materials were not partially dried prior to extrusion. The properties of the catalyst are listed in Tables I and II.

COMPARATIVE EXAMPLE B

A catalyst was prepared in a manner similar to Example 3 except that the materials were not partially dried prior to extrusion. The properties of the catalyst are listed in Tables I and II.

COMPARATIVE EXAMPLE C

A catalyst was prepared utilizing a non-hydrogel technique. The catalyst is commercially available from Shell under the name S-317. The properties of the catalyst are listed in Tables I and II.

CATALYST TESTING

Catalyst samples were used to hydrotreat a catalytically-cracked heavy gas oil (CCHGO) in a trickle-flow reactor. Ten ccs of the extruded catalyst were crushed and sieved to a 16-45 mesh, diluted with silicon carbide, and loaded into a typical trickle-flow reactor tube. The catalyst was presulfided with a 5% $H_2S/H_2$ (v/v) gas mixture at 700° F. for 2 hours prior to testing. A CCHGO was passed over the catalyst at 675° F. and 850 psig $H_2$ with a $H_2$/oil equal to 4.0. Rate constants are reported relative to the non-hydrogel catalyst (Comparative Example C) and are calculated basis the total metals content of the catalyst. Measured rate constants include hydrogenation, denitrification and desulfurization. Specific catalyst performance characteristics are presented in Table III.

TABLE I

| | | | | Catalyst Properties | | | |
|---|---|---|---|---|---|---|---|
| | EXAMPLE 1 | EXAMPLE 2 | EXAMPLE 3 | EXAMPLE 4 | COMPARATIVE EXAMPLE A | COMPARATIVE EXAMPLE B | COMPARATIVE EXAMPLE C |
| Aging pH[a] | 8.7 | 8.5 | 8.7 | 8.5 | 11.0–12.0 | 11.0 | — |
| Density g/cc[b] | 0.52 | 0.51 | 0.48 | 0.57 | 0.72 | 0.65 | 0.60 |
| Reslurry pH[c] | 5.0 | 5.0 | 5.0 | 5.0 | 5.0 | 5.5 | — |
| $N_2$ Surface Area $m^2/g$[d] | 337.0 | 330.0 | 314.0 | 320.0 | 428.0 | 447.0 | 240.0 |
| $N_2$ Pore Volume cc/g[e] | 0.73 | 0.64 | 0.73 | 0.59 | 0.54 | 0.56 | — |
| LOI Prior to Extrusion[f] | 62.5 | 62.5 | 62.5 | 62.5 | ~90 | ~90 | — |
| % wt. Nickel[g] | 2.6 | 2.8 | — | — | 1.2 | — | 2.52 |
| % wt. Cobalt[g] | — | — | 2.1 | 2.4 | — | 2.3 | — |
| % wt. Molybdenum[h] | 11.0 | 12.0 | 12.0 | 12.0 | 11.8 | 11.8 | 12.0 |

TABLE I-continued

Catalyst Properties

| | EXAMPLE 1 | EXAMPLE 2 | EXAMPLE 3 | EXAMPLE 4 | COMPARATIVE EXAMPLE A | COMPARATIVE EXAMPLE B | COMPARATIVE EXAMPLE C |
|---|---|---|---|---|---|---|---|
| % wt. Phosphorus[i] | 3.4 | 2.2 | 3.0 | 2.4 | 3.4 | 3.7 | 0.0 |

TABLE II

Catalyst Pore Size Distributions

| Hg Pore[j] Size Dist | EXAMPLE 1 | EXAMPLE 2 | EXAMPLE 3 | EXAMPLE 4 | COMPARATIVE EXAMPLE A | COMPARATIVE EXAMPLE B | COMPARATIVE EXAMPLE C |
|---|---|---|---|---|---|---|---|
| <50 ang | 25.3 | 23.0 | 15.9 | 29.1 | 86.3 | 91.3 | 2.6 |
| 50–70 ang | 26.9 | 28.5 | 23.8 | 22.3 | 4.8 | 3.4 | 11.6 |
| 70–100 ang | 11.4 | 12.3 | 18.4 | 11.7 | 3.0 | 1.7 | 31.2 |
| 100–150 ang | 6.1 | 6.0 | 8.3 | 7.1 | 2.8 | 0.5 | 24.4 |
| 150–350 ang | 11.4 | 5.9 | 8.8 | 7.7 | 2.5 | 0.0 | 11.0 |
| >350 ang | 18.9 | 27.3 | 24.7 | 22.0 | 0.7 | 3.2 | 19.3 |

[a]Measured using an Orion 231 pH meter and Orion electrodes.
[b]209 cc volume fully settled in a graduated cup and weighed.
[c]Measured using an Orion 231 pH meter and Orion electrodes.
[d]BET (Brunauer, S., Emmet, P. Y. and Teller, E., J. Am. Chem. Soc., 60, 309–316 (1938)) by nitrogen adsorption/desorption, Micromeritics Digisorb 2500 Instrument.
[e]By nitrogen adsorption, Micromeritics Digisorb 2500 Instrument.
[f]Loss-on-ignition: the fraction of volatile materials removed when held at 950°F. for two hours, expressed as a percentage of the original weight.
[g]Weight percent determined by neutron activation analysis or atomic absorption spectroscopy.
[h]Weight percent determined by neutron activation analysis or atomic absorption spectroscopy.
[i]Weight percent determined by neutron activation analysis or atomic absorption spectroscopy.
[j]Determined by mercury intrusion, to 60,000 psi using a Micromeritics Autopore 9210, using a 130° contact angle and 0.473 N/m surface tension of mercury. Numbers listed are percent pore volume.

TABLE III

Specific Catalyst Performance

| | CCHGO (METALS BASIS) | | | NO. GRAMS METAL IN 10 CC CAT. | DENSITY G/CC | WEIGHT % | | |
|---|---|---|---|---|---|---|---|---|
| | H | N | S | | | Ni | Co | Mo |
| Example 1 | 1.19 | 1.46 | 1.28 | 0.707 | 0.52 | 2.6 | — | 11.0 |
| Example 3 | 1.12 | 1.05 | 1.69 | 0.677 | 0.48 | — | 2.1 | 12.0 |
| Example 4 | 0.91 | 0.75 | 1.15 | 0.821 | 0.57 | — | 2.4 | 12.0 |
| Comparative Example C | 1.00 | 1.00 | 1.00 | 0.870 | 0.60 | 2.5 | — | 12.0 |

I claim as my invention:

1. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of one or more aluminum salt(s) with a titrating agent in the presence of a phosphorus-containing compound in an amount of from about 0.06 to about 0.30 moles of phosphorus per mole of aluminum, thereby forming a precipitate, (b) aging the precipitate at a temperature ranging from about 20° C. to about 90° C. for at least about 15 minutes at a pH ranging from about 8.0 to about 12.0, (c) washing the precipitate, (d) mixing the precipitate with salts of an element selected from the group consisting of nickel, cobalt, and mixtures thereof, and salts of a heavy metal selected from the group consisting of molybdenum, tungsten, and mixtures thereof, at a pH in the range between about 4.0 and about 9.0 and a temperature in the range between about 25° C. and about 100° C. until adsorption of the salts onto the precipitate is sufficient to yield a final catalyst having from about 1% w to about 5% w cobalt and/or nickel and from about 8% w to about 32% w heavy metal, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

2. The process of claim 1 wherein the precipitation is carried out at a pH in the range between about 5.5 and about 10.0.

3. The process of claim 1 wherein the precipitation is carried out at a temperature between about 20° C. and about 90° C.

4. The process of claim 1 wherein the aging pH is in the range between about 8.0 and about 11.0.

5. The process of claim 1 wherein step (d) is carried out at a pH in the range between about 4.0 and about 8.0.

6. The process of claim 1 wherein step (d) contains solubilized salts of nickel and molybdenum.

7. The process of claim 6 wherein, in step (d), a phosphorus-containing compound in an amount of from about 0.2 to about 1.5 moles of phosphorus per mole of molybdenum is added.

8. The process of claim 6 wherein said catalyst contains from about 2.5% w to about 4% w nickel and from about 8% w to about 18% w molybdenum.

9. The process of claim 1 wherein step (d) contains salts of cobalt and molybdenum.

10. The process of claim 9 wherein, in step (d), a phosphorus-containing compound in an amount of from about 0.2 to about 1.5 moles of phosphorus per mole of molybdenum is added.

11. The process of claim 9 wherein said catalyst contains from about 2.5% w to about 4% w cobalt and from about 8% w to about 18% w molybdenum.

12. The process of claim 1 wherein, in step (d), a phosphorus-containing compound in an amount of from about 0.2 to about 1.5 moles of phosphorus per mole of heavy metal is added.

13. A process for hydrotreating hydrocarbon feeds by contacting said feeds at a temperature in the range of from about 300° F. to about 900° F. and a pressure in the range of from about 200 psig to about 3500 psig with a catalyst having a surface area of at least about 300 m²/g, at least about 20% of the pore volume in pores having diameters greater than about 350 Å and at least about 20% of the pore volume in pores having diameters less than about 70 Å , wherein said catalyst is prepared by a process which comprises:
  (a) precipitating an aqueous solution of one or more aluminum salt(s) in the presence of a phosphorus-containing compound by in an amount of from about 0.06 to about 0.30 moles of phosphorus per mole of aluminum, by adjusting the pH of said solution to a range between about 5.5 and about 10.0 and a temperature in the range between about 20° C. and about 90° C., thereby forming a precipitate,
  (b) aging the precipitate at a temperature ranging from about 20° C. to about 90° C. for at least about 15 minutes at a pH ranging from about 8.0 to about 12.0,
  (c) washing the precipitate,
  (d) mixing the precipitate with one or more solution(s) containing salts of a heavy metal selected from the group consisting of molybdenum, tungsten and mixtures thereof, and salts of an element selected from the group consisting of nickel, cobalt and mixtures thereof, at a pH in the range between about 4.0 and about 9.0 and a temperature in the range between about 25° C. and about 100° C. until adsorption of the salts onto the precipitate is sufficient to yield a final catalyst having from about 1% w to about 5% w nickel and/or cobalt and from about 8% w to about 32% w heavy metal,
  (e) partially drying the product of step (d) to reduce loss on ignition to between about 55% and about 65%,
  (f) passing the product of step (e) through a mixing means,
  (g) extruding the product of step (f), and
  (h) drying and calcining the product of step (g) at a temperature ranging from about 300° C. to about 900° C.

14. The process of claim 13 wherein the precipitation is carried out at a pH in the range between about 5.5 and about 8.0.

15. The process of claim 13 wherein the precipitation is carried out at a temperature between about 50° C. and about 85° C.

16. The process of claim 13 wherein the aging pH is in the range between about 8.0 and about 11.0.

17. The process of claim 13 wherein step (d) is carried out at a pH in the range between about 4.0 and about 8.0.

18. The process of claim 13 wherein said solution step (d) contains solubilized salts of nickel and molybdenum.

19. The process of claim 18 wherein said solution in step (d) additionally contains a phosphorus-containing compound in an amount of from about 0.2 to about 1.5 moles of phosphorus per mole of molybdenum.

20. The process of claim 18 wherein said catalyst contains from about 2.5% w to about 4% w nickel and from about 8% w to about 18% w molybdenum.

21. The process of claim 13 wherein said solution in step (d) contains salts of cobalt and molybdenum.

22. The process of claim 21 wherein said solution in step (d) additionally contains a phosphorus-containing compound in an amount of from about 0.2 to about 1.5 moles of phosphorus per mole of molybdenum.

23. The process of claim 21 wherein said catalyst contains from abouty 2.5% w to about 4% w cobalt and from about 8% w to about 18% w molybdenum.

24. The process of claim 13 wherein said solution in step (d) additionally contains a phosphorus-containing compound in an amount of from about 0.2 to about 1.5 moles of phosphorus per mole of heavy metal.

25. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at contacting said feeds with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:
  (a) precipitating an aqueous solution of one or more aluminum salt(s) in the presence of a phosphorus-containing compound in an amount of from about 0.06 to about 0.30 moles of phosphorus per mole of aluminum, by adjusting the pH of said solution to a range between about 5.5 and about 10.0 at a temperature in the range between about 20° C. and about 90° C., thereby forming a precipitate,
  (b) aging the precipitate at a temperature ranging from about 20° C. to about 90° C. for at least about 15 minutes at a pH ranging from about 8.0 to about 12.0,
  (c) washing the precipitate,
  (d) mixing the precipitate with dry, water-soluble salts of an element selected from the group consisting of nickel, cobalt and mixtures thereof, and dry, water soluble salts of a heavy metal selected from the group consisting of molybdenum, tungsten and mixtures thereof, at a pH in the range between about 4.0 and about 9.0 and a temperature in the range between about 25° C. and about 100° C. to yield a final catalyst having from about 1% w to about 5% w nickel and/or cobalt and from about 8% w to about 32% w heavy metal,
  (e) partially drying the product of step (d) to reduce loss on ignition to between about 55% and about 65%,
  (f) passing the product of step (e) through a mixing means,
  (g) extruding the product of step (f), and (h) drying and calcining the product of step (g) at a temperature ranging from about 300° C. to about 900° C.

26. The process of claim 25 wherein the precipitation is carried out at a pH in the range between about 5.5 and about 8.0.

27. The process of claim 25 wherein the precipitation is carried out at a temperature between about 50° C. and about 85° C.

28. The process of claim 25 wherein the aging pH is in the range between about 8.0 and about 11.0.

29. The process of claim 25 wherein step (d) is carried out at a pH in the range between about 4.0 and about 8.0.

30. The process of claim 25 wherein said salts in step (d) are salts of nickel and molybdenum.

31. The process of claim 30 wherein, in step (d), a phosphorus-containing compound in an amount of from about 0.2 to about 1.5 moles of phosphorus per mole of molybdenum is added.

32. The process of claim 30 wherein said catalyst contains from about 2.5% w to about 4% w nickel and from about 8% w to about 18% w molybdenum.

33. The process of claim 25 wherein said salts in step (d) are salts of cobalt and molybdenum.

34. The process of claim 33 wherein, in step (d), a phosphorous-containing compound in an amount of from about 0.2 to about 1.5 moles of phosphorus per mole of molybdenum is added.

35. The process of claim 33 wherein said catalyst contains from about 2.5% w to about 4% w cobalt and from about 8% w to about 18% w molybdenum.

36. The process of claim 25 wherein, in step (d), a phosphorus-containing compound in an amount of from about 0.2 to about 1.5 moles of phosphorus per mole of heavy metal is added.

37. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at of at least about 300 m²/g, at least about 20% of the pore volume in pores having diameters greater than about 350 Å and at least about 20% of the pore volume in pores having diameters less than about 70 Å, wherein said catalyst is prepared by a process which comprises:
(a) precipitating an aqueous solution of one or more aluminum salt(s) in the presence of a phosphorus-containing compound in an amount of from about 0.06 to about 0.30 moles of phosphorus per mole of aluminum, by thereby forming a precipitate, adjusting the pH of said solution to a range between about 5.5 and about 10.0 at a temperature in the range between about 20° C. and about 90° C., thereby forming a precipitate,
(b) aging the precipitate at a temperature ranging from about 20° C. to about 90° C. for at least about 15 minutes at a pH ranging from about 8.0 to about 12.0,
(c) washing the precipitate,
(d) mixing a dry, water-soluble salt of a heavy metal selected from the group consisting of molybdenum, tungsten and mixtures thereof, and a mixture of a dry, water-soluble salt selected from the group consisting of nickel, cobalt and mixtures thereof, and a phosphorus-containing compound in an amount of from about 0.2 to about 1.5 moles of phosphorus per mole of heavy metal with the precipitate at a pH in the range between about 4.0 and about 9.0 and a temperature in the range between about 25° C. and about 100° C. to yield a final catalyst having from about 1% w to about 5% w nickel and/or cobalt and from about 8% w to about 32% w heavy metal,
(e) partially drying the product of step (d) to reduce loss on ignition to between about 55% and about 65%,
(f) passing the product of step (e) through a mixing means,
(g) extruding the product of step (f), and
(h) drying and calcining the product of step (g) at a temperature ranging from about 300° C. to about 900° C.

38. The process of claim 37 wherein the precipitation is carried out at a pH in the range between about 5.5 and about 8.0.

39. The process of claim 37 wherein the precipitation is carried out at a temperature between about 50° C. and about 85° C.

40. The process of claim 37 wherein the aging pH is in the range between about 8.0 and about 11.0.

41. The process of claim 37 wherein step (d) is carried out at a pH in the range between about 4.0 and about 8.0.

42. The process of claim 37 wherein said phosphorus-containing compound in steps (a) and (d) is independently selected from the group consisting of phosphoric acid, a phosphate salt and mixtures thereof.

43. The process of claim 37 wherein said salts in step (d) salts are salts of nickel and molybdenum.

44. The process of claim 43 wherein said catalyst contains from about 2.5% w to about 4% w nickel and from about 8% w to about 18% w molybdenum.

45. The process of claim 37 wherein said salts in step (d) salts are salts of cobalt and molybdenum.

46. The process of claim 45 wherein said catalyst contains from about 2.5% w to about 4% w cobalt and from about 8% w to about 18% w molybdenum.

47. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:
(a) titrating an aqueous solution of an acid aluminum salt with an aqueous solution of a basic aluminum compound in the presence of a phosphorus-containing compound in an amount of from about 0.06 to about 0.30 moles of phosphorus per mole of aluminum, at a pH in the range between about 5.5 and about 10.0 and a temperature in the range between about 20° C. and about 90° C., thereby forming a precipitate,
(b) aging the precipitate at a temperature ranging from about 20° C. to about 90° C. for at least about 15 minutes at a pH ranging from about 8.0 to about 12.0,
(c) washing the precipitate,
(d) mixing the precipitate with one or more solution(s) containing salts of a heavy metal selected from the group consisting of molybdenum, tungsten and mixtures thereof, and salts of an element selected from the group consisting of nickel, cobalt and mixtures thereof, at a pH in the range between about 4.0 and about 9.0 and a temperature in the range between about 25° C. and about 100° C. until adsorption of the salts onto the precipitate is sufficient to yield a final catalyst having from about 1% w to about 5% w nickel and/or cobalt and from about 8% w to about 32% w heavy metal,
(e) partially drying the product of step (d) to reduce loss on ignition to between about 55% and about 65%,
(f) passing the product of step (e) through a mixing means,
(g) extruding the product of step (f), and
(h) drying and calcining the product of step (g) at a temperature ranging from about 300° C. to about 900° C.

48. The process of claim 47 wherein the precipitation is carried out at a pH in the range between about 5.5 and about 8.0.

49. The process of claim 47 wherein the precipitation is carried out at a temperature between about 50° C. and about 85° C.

50. The process of claim 47 wherein the aging pH is in the range between about 8.0 and about 11.0.

51. The process of claim 47 wherein step (d) is carried out at a pH in the range between about 4.0 and about 8.0.

52. The process of claim 47 wherein said solution in step (d) contains salts of nickel and molybdenum.

53. The process of claim 52 wherein said solution in step (d) additionally contains a phosphorus-containing compound in an amount of from about 0.2 to about 1.5 moles of phosphorus per mole of molybdenum.

54. The process of claim 52 wherein said catalyst contains from about 2.5% w to about 4% w nickel and from about 8% w to about 18% w molybdenum.

55. The process of claim 47 wherein said solution in step (d) contains salts of cobalt and molybdenum.

56. The process of claim 55 wherein said solution in step (d) additionally contains a phosphorus-containing compound in an amount of from about 0.2 to about 1.5 moles of phosphorus per mole of molybdenum.

57. The process of claim 55 wherein said catalyst contains from about 2.5% w to about 4% w cobalt and from about 8% w to about 18% w molybdenum.

58. The process of claim 47 wherein said solution in step (d) additionally contains a phosphorus-containing compound in an amount of from about 0.2 to about 1.5 moles of phosphorus per mole of heavy metal.

59. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m$^2$/g, at least about 20% of the pore volume in pores having diameters greater than about 350 Å and at least about 20% of the pore volume in pores having diameters less than about 70 Å, wherein said catalyst is prepared by a process which comprises:
(a) titrating an aqueous solution of an acid aluminum salt with an aqueous solution of a basic aluminum compound in the presence of a phosphorus-containing compound in an amount of from about 0.06 to about 0.30 moles of phosphorus per mole of aluminum, at a pH in the range between about 5.5 and about 10.0 and a temperature in the range between about 20° C. and about 90° C., thereby forming a precipitate,
(b) aging the precipitate at a temperature ranging from about 20° C. to about 90° C. for at least about 15 minutes at a pH ranging from about 8.0 to about 12.0,
(c) washing the precipitate,
(d) mixing the precipitate with dry, water-soluble salts an element selected from the group consisting of nickel, cobalt and mixtures thereof, and dry, water-soluble salts of a heavy metal selected from the group consisting of molybdenum, tungsten and mixtures thereof, at a pH in the range between about 4.0 and about 9.0 and a temperature in the range between about 25° C. and about 100° C. to yield a final catalyst having from about 1% w to about 5% w nickel and/or cobalt and from about 8% w to about 32% w heavy metal,
(e) partially drying the product of step (d) to reduce loss on ignition to between about 55% and about 65%,
(f) passing the product of step (e) through a mixing means,
(g) extruding the product of step (f), and
(h) drying and calcining the product of step (g) at a temperature ranging from about 300° C. to about 900° C.

60. The process of claim 59 wherein the precipitation is carried out at a pH in the range between about 5.5 and about 8.0.

61. The process of claim 59 wherein the precipitation is carried out at a temperature between about 50° C. and about 85° C.

62. The process of claim 59 wherein the aging pH is in the range between about 8.0 and about 11.0.

63. The process of claim 59 wherein step (d) is carried out at a pH in the range between about 4.0 and about 8.0.

64. The process of claim 59 wherein said salts in step (d) are salts of nickel and molybdenum.

65. The process of claim 64 wherein, in step (d), a phosphorus-containing compound in an amount of from about 0.2 to about 1.5 moles of phosphorus per mole of molybdenum is added.

66. The process of claim 64 wherein said catalyst contains from about 2.5% w to about 4% w nickel and from about 8% w to about 18% w molybdenum.

67. The process of claim 59 wherein said salts in step (d) are salts of cobalt and molybdenum.

68. The process of claim 67 wherein, in step (d), a phosphorus-containing compound in an amount of from about 0.2 to about 1.5 moles of phosphorus per mole of molybdenum is added.

69. The process of claim 67 wherein said catalyst contains from about 2.5% w to about 4% w cobalt and from about 8% w to about 18% w molybdenum.

70. The process of claim 59 wherein, in step (d), a phosphorus-containing compound in an amount of from about 0.2 to about 1.5 moles of phosphorus per mole of heavy metal is added.

71. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m$^2$/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt with an aqueous solution of a basic aluminum compound in the presence of a phosphorus-containing compound in an amount of from about 0.06 to about 0.30 moles of phosphorus per mole of aluminum, at a pH in the range between about 5.5 and about 10.0 and a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 12.0, (c) washing the precipitate, (d) mixing a dry, water-soluble salt of heavy metal selected from the group consisting of molybdenum, tungsten and mixtures thereof, and a mixture of a dry, water-soluble salt selected from the group consisting of nickel, cobalt and mixtures thereof, and a phosphorus-containing compound in an amout of from about 0.2 to about 1.5 moles of phosphorus per mole of heavy metal with the precipitate at a pH in the range between about 4.0 and about 9.0 and a temperature in the range between about 25° C. and about 100° C. to yield a final catalyst having from about 1% w to about 5% w nickel and/or cobalt and from about 8% w to about 32% w heavy metal, (e) partially drying the product of step (d) to reduce loss on ingnition to between about 55% and about 65%, (f) passing the product of step (e) through a mixing means, (g) extruding the product of step (f), and (h) drying and calcining the product of step (g) at a temperature ranging from about 300° C. to about 900° C.

72. The process of claim 71 wherein the precipitation is carried out at a pH in the range between about 5.5 and about 8.0.

73. The process of claim 71 wherein the precipitation is carried out at a temperature between about 50° C. and about 85° C.

74. The process of claim 71 wherein the aging pH is in the range between about 8.0 and about 11.0.

75. The process of claim 71 wherein step (d) is carried out at a pH in the range between about 4.0 and about 8.0.

76. The process of claim 71 wherein said phosphorus-containing compound in steps (a) and (d) is independently selected from the group consisting of phosphoric acid, a phosphate salt and mixtures thereof.

77. The process of claim 71 wherein said salts in step (d) are salts of nickel and molybdenum.

78. The process of claim 77 wherein said catalyst contains from about 2.5% w to about 4% w nickel and from about 8% w to about 18% w molybdenum.

79. The process of claim 71 wherein said salts in step (d) are salts of cobalt and molybdenum.

80. The process of claim 79 wherein said catalyst contains from about 2.5% w to about 4% w cobalt and from about 8% w to about 18% w molybdenum.

81. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 $m^2/g$, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, thereby forming a precipitate, phosphorus-containing compound at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with one or more solution(s) containing molybdate or dimolybdate salts and nickel salts, and phosphoric acid in an amount of from about 0.2 to about 1.5 moles of phosphorus per mole of molybdenum at a pH in the range between about 4.0 and about 8.0 and a temperature in the range between about 25° C. and about 100° C. until adsorption of the salts onto the precipitate is sufficient to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

82. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 $m^2/g$, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with one or more solution(s) containing molybdate or dimolybdate salts and nickel salts at a pH in the range between about 4.0 and about 8.0 and a temperature in the range between about 25° C. and about 100° C. until adsorption of the salts onto the precipitate is sufficient to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

83. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with one or more solution(s) containing molybdate or dimolybdate salts and cobalt salts and phosphoric acid in an amount of from about 0.2 to about 1.5 moles of phosphorus per mole of molybdenum at a pH in the range between about 4.0 and about 8.0 and a temperature in the range between about 25° C. and about 100° C. until adsorption of the salts onto the precipitate is sufficient to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

84. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with one or more solution(s) containing molybdate or dimolybdate salts and cobalt salts at a pH in the range between about 4.0 and about 8.0 and a temperature in the range between about 25° C. and about 100° C. until adsorption of the salts onto the precipitate is sufficient to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) dring and calcining the product of step (g) at a temperature ranging from about 300° C. to about 900° C.

85. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with dry, water-soluble nickel salts, dry, water-soluble molybdate or dimolybdate salts, and phosphoric acid in an amount of from about 0.2 to about 1.5 moles of phosphorus per mole of molybdenum, at a pH in the range between about 4.0 and about 8.0 and a temperature in the range between about 25° C. and about 100° C. to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

86. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with dry, water-soluble nickel salts and dry, water-soluble molybdate or dimolybdate salts at a pH in the range between about 4.0 and about 8.0 and a temperature in the range between about 25° C. and about 100° C. to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

87. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with dry, water-soluble cobalt salts, dry, water-soluble molybdate or dimolybdate salts, and phosphoric acid in an amount of from about 0.2 to about 1.5 moles of phosphorus per mole of molybdenum, at a pH in the range between about 4.0 and about 8.0 and a temperature in the range between about 25° C. and about 100° C. to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

88. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with dry, water-soluble cobalt salts and dry, water-soluble molybdate or dimolybdate salts at a pH in the range between about 4.0 and about 8.0 and a temperature in the range between about 25° C. and about 100° C. to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

89. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing a dry, water-soluble molybdate or dimolybdate salt and a mixture of a dry, water-soluble nickel salt and phosphoric acid in an amount of from about 0.2 to about 1.5 moles of phosphorus per mole of molybdenum with the precipitate at a pH in the range between about 4.0 and about 8.0 and a temperature in the range between about 25° C. and about 100° C. to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

90. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing a dry, water-soluble molybdate or dimolybdate salt and a mixture of a dry, water-soluble cobalt salt and phosphoric acid in an amount of from about 0.2 to about 1.5 moles of phosphorus per mole of molybdenum with the precipitate at a pH in the range between about 4.0 and about 8.0 and a temperature in the range between about 25° C. and about 100° C. to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

91. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a base in the presence of a phosphorus-containing compound in an amount of from about 0.06 to about 0.30 moles of phosphorus per mole of alumina, at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with one or more solution(s) containing molybdate or dimolybdate salts and nickel salts, and phosphoric acid in an amount of from about 0.2 to about 1.5 moles of phosphorus per mole of molybdenum at a pH in the range between about 4.0 and about 8.0 and a temperature in the range between about 25° C. and about 100° C. until adsorption of the salts onto the precipitate is sufficient to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

92. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m$^2$/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a base in the presence of a phosphorus-containing compound in an amount of from about 0.06 to about 0.30 moles of phosphorus per mole of aluminum, at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with one or more solution(s) containing molybdate or dimolybdate salts and nickel salts at a pH in the range between about 4.0 and about 8.0 and a temperature in the range between about 25° C. and about 100° C. until adsorption of the salts onto the precipitate is sufficient to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

93. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m$^2$/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride with an aqueous solution of a base in the presence of a phosphorus-containing compound in an amount of from about 0.06 to about 0.30 moles of phosphorus per mole of aluminum, at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with one or more solution(s) containing molybdate or dimolybdate salts and cobalt salts, and phosphoric acid in an amount of from about 0.2 to about 1.5 moles of phosphorus per mole of molybdenum at a pH in the range between about 4.0 and about 8.0 and a temperature in the range between about 25° C. and about 100° C. until adsorption of the salts onto the precipitate is sufficient to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

94. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m$^2$/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride with an aqueous solution of a base in the presence of a phosphorus-containing compound in an amount of from about 0.06 to about 0.30 moles of phosphorus per mole of aluminum, at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with one or more solution(s) containing molybdate or dimolybdate salts and cobalt salts at a pH in the range between about 4.0 and about 8.0 and a temperature in the range between about 25° C. and about 100° C. until adsorption of the salts onto the precipitate is sufficient to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

95. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m$^2$/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a base in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with dry, water-soluble nickel salts, dry, water-soluble molybdate or dimolybdate salts, and phosphoric acid in an amount of from about 0.2 to about 1.5 moles of phosphorus per mole of molybdenum, at a pH in the range between about 4.0 and about 8.0 and a temperature in the range between about 25° C. and about 100° C. to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

96. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m$^2$/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a base in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with dry, water-soluble nickel salts and dry, water-soluble molybdate or dimolybdate salts at a pH in the range between about 4.0 and about 8.0 and a temperature in the range between about 25° C. and about 100° C. to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

97. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m$^2$/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a base in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with dry, water-soluble cobalt salts, dry, water-soluble molybdate or dimolybdate salts, and phosphoric acid in an amount of from about 0.2 to about 1.5 moles of phosphorus per mole of molybdenum, at a pH in the range between about 4.0 and about 8.0 and a temperature in the range between about 25° C. and about 100° C. to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

98. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a base in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with dry, water-soluble cobalt salts and dry, water-soluble molybdate or dimolybdate salts at a pH in the range between about 4.0 and about 8.0 and a temperature in the range between about 25° C. and about 100° C. to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

99. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a base in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing a dry, water-soluble molybdate or dimolybdate salt and a mixture of a dry, water-soluble nickel salt and phosphoric acid in an amount of from about 0.2 to about 1.5 moles of phosphorus per mole of molybdenum with the precipitate at a pH in the range between about 4.0 and about 8.0 and a temperature in the range between about 25° C. and about 100° C. to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

100. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid aluminum salt selected from the group consisting of aluminum sulfate, aluminum nitrate and aluminum chloride, with an aqueous solution of a base in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing a dry, water-soluble molybdate or dimolybdate salt and a mixture of a dry, water-soluble cobalt salt and phosphoric acid in an amount of from about 0.2 to about 1.5 moles of phosphorus per mole of molybdenum with the precipitate at a pH in the range between about 4.0 and about 8.0 and a temperature in the range between about 25° C. and about 100° C. to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

101. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid with an aqueous solution of a basic aluminum compound selected from the group consisting of sodium aluminate and potassium aluminate in the presence of a phosphorus-containing compound in an amount of from about 0.06 to about 0.30 moles of phosphorus per mole of aluminum, at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with one or more solution(s) containing molybdate or dimolybdate salts and nickel salts, and phosphoric acid in an amount of from about 0.2 to about 1.5 moles of phosphorus per mole of molybdenum at a pH in the range between about 4.0 and about 8.0 and a temperature in the range between about 25° C. and about 100° C. until adsorption of the salts onto the precipitate is sufficient to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

102. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid with an aqueous solution of a basic aluminum compound selected from the group consisting of sodium aluminate and potassium aluminate in the presence of a phosphorus-containing compound in an amount of from about 0.06 to about 0.30 moles of phosphorus per mole of aluminum, at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with one or more solution(s) containing molybdate or dimolybdate salts and nickel salts at a pH in the range between about 4.0 and about 8.0 and a temperature in the range between about 25° C. and about 100° C. until adsorption of the salts onto the precipitate is sufficient to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

103. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid with an aqueous solution of a basic aluminum compound selected from the group consisting of sodium aluminate and potassium aluminate in the presence of a phosphorus-containing compound in an amount of from about 0.06 to about 0.30 moles of phosphorus per mole of aluminum, a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, ranging from about 300° C. to about 900° C.

(c) washing the precipitate, (d) mixing the precipitate with one or more solution(s) containing molybdate or dimolybdate salts and cobalt salts, and a phosphoric acid in an amount of from about 0.2 to about 1.5 moles of phosphorus per mole of molybdenum at a pH in the range between about 4.0 and about 8.0 and a temperature in the range between about 25° C. and about 100° C. until adsorption of the salts onto the precipitate is sufficient to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

104. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m$^2$/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid with an aqueous solution of a basic aluminum compound selected from the group consisting of sodium aluminate and potassium aluminate in the presence of a phosphorus-containing compound in an amount of from about 0.06 to about 0.30 moles of phosphorus per mole of aluminum, at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with one or more solution(s) containing molybdate or dimolybdate salts and cobalt salts at a pH in the range between about 4.0 and about 8.0 and a temperature in the range between about 25° C. and about 100° C. until adsorption of the salts onto the precipitate is sufficient to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

105. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m$^2$/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with dry, water-soluble nickel salts, dry, water-soluble molybdate or dimolybdate salts, and phosphoric acid in an amount of from about 0.2 to about 1.5 moles of phosphorus per mole of molybdenum, at a pH in the range between about 4.0 and about 8.0 and a temperature in the range between about 25° C. and about 100° C. to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

106. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m$^2$/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with dry, water-soluble nickel salts and dry, water-soluble molybdate or dimolybdate salts at a pH in the range between about 4.0 and about 8.0 and a temperature in the range between about 25° C. and about 100° C. to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

107. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with dry, water-soluble cobalt salts, dry, water-soluble molybdate or dimolybdate salts, and phosphoric acid in an amount of from about 0.2 to about 1.5 moles of phosphorus per mole of molybdenum, at a pH in the range between about 4.0 and about 8.0 and a temperature in the range between about 25° C. and about 100° C. to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

108. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing the precipitate with dry, water-soluble cobalt salts and dry, water-soluble molybdate or dimolybdate salts at a pH in the range between about 4.0 and about 8.0 and a temperature in the range between about 25° C. and about 100° C. to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

109. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about contacting said feeds with a hydrotreating catalyst having a surface area of at least about 300 m²/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing a dry, water-soluble molybdate or dimolybdate salt and a mixture of a dry, water-soluble nickel salt and phosphoric acid in an amount of from about 0.2 to about 1.5 moles of phosphorus per mole of molybdenum with the precipitate at a pH in the range between about 4.0 and about 8.0 and a temperature in the range between about 25° C. and about 100° C. to yield a final catalyst having from about 2.5% w to about 4% w nickel and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

110. A process for hydrotreating hydrocarbon feeds by contacting said feeds at a temperature in the range of from about 300° F. to about 900° F. and a pressure in the range of from about 200 psig to about 3500 psig with a hydrotreating catalyst having a surface area of at least about 300 m$^2$/g, at least about 20% of the pore volume in pores having diameters greater than about 350 Å and at least about 20% of the pore volume in pores having diameters less than about 70 Å, wherein said catalyst is prepared by a process which comprises:

(a) titrating an aqueous solution of an acid with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 8.0 to about 11.0, (c) washing the precipitate, (d) mixing a dry, water-soluble molybdate or dimolybdate salt and a mixture of a dry, water-soluble cobalt salt and phosphoric acid in an amount of from about 0.2 to about 1.5 moles of phosphorus per mole of molybdenum with the precipitate at a pH in the range between about 4.0 and about 8.0 and a temperature in the range between about 25° C. and about 100° C. to yield a final catalyst having from about 2.5% w to about 4% w cobalt and from about 10% w to about 14% w molybdenum, (e) partially drying the product of step (d) to reduce loss on ignition to between about 55% and about 65%, (f) passing the product of step (e) through a mixing means, (g) extruding the product of step (f), and (h) drying and calcining the product of step (g) at a temperature ranging from about 300° C. to about 900° C.

* * * * *